(12) United States Patent
Tadano

(10) Patent No.: US 8,704,469 B2
(45) Date of Patent: Apr. 22, 2014

(54) TORQUE RIPPLE SUPPRESSION CONTROL APPARATUS AND TORQUE RIPPLE SUPPRESSION CONTROL METHOD FOR ROTATING ELECTRICAL MACHINE

(75) Inventor: Yugo Tadano, Tokyo (JP)

(73) Assignee: Meidensha Corporation, Tokyo (JP)

( * ) Notice: Subject to any disclaimer, the term of this patent is extended or adjusted under 35 U.S.C. 154(b) by 54 days.

(21) Appl. No.: 13/579,369

(22) PCT Filed: Feb. 22, 2011

(86) PCT No.: PCT/JP2011/053798
§ 371 (c)(1),
(2), (4) Date: Aug. 16, 2012

(87) PCT Pub. No.: WO2011/105355
PCT Pub. Date: Sep. 1, 2011

(65) Prior Publication Data
US 2012/0306411 A1 Dec. 6, 2012

(30) Foreign Application Priority Data
Feb. 25, 2010 (JP) .................................. 2010-039525

(51) Int. Cl.
*H02P 21/00* (2006.01)
(52) U.S. Cl.
USPC ............ 318/400.02; 318/400.07; 318/400.15; 318/400.23; 318/431; 318/432
(58) Field of Classification Search
USPC ............. 318/400.02, 400.07, 400.15, 400.23, 318/431, 432, 434
See application file for complete search history.

(56) References Cited

U.S. PATENT DOCUMENTS

| 2007/0007072 A1* | 1/2007 | Ta et al. ........................ 180/446 |
| 2007/0090782 A1* | 4/2007 | Endo et al. .................... 318/432 |
| 2011/0175556 A1* | 7/2011 | Tobari et al. ............. 318/400.02 |

FOREIGN PATENT DOCUMENTS

| JP | 2004-120814 A | 4/2004 |
| JP | 2007-267466 A | 10/2007 |
| JP | 2009-296752 A | 12/2009 |

OTHER PUBLICATIONS

Tadano et al., "A study on torque ripple suppression control that focuses attraction on the periodic disturbance of permanent magnet synchronous motor", *2009 annual conference of I.E.E. Japan, Industry Application Society*, pp. 615-618, Aug. 31-Sep. 2, 2009.

\* cited by examiner

*Primary Examiner* — Eduardo Colon Santana
*Assistant Examiner* — Iftekhar Mustafa
(74) *Attorney, Agent, or Firm* — Foley & Lardner LLP

(57) ABSTRACT

A periodic disturbance observer determines real part $I\hat{}_{An}$ and imaginary part $I\hat{}_{Bn}$ of an estimated current including a periodic disturbance, from value of identification identifying a system transfer function of an nth order torque ripple frequency component from a command torque to a detected torque value, with a one-dimensional complex vector having a real part $P\hat{}_{An}$ and an imaginary part $P\hat{}_{Bn}$, a cosine coefficient $T_{An}$, a sine coefficient $T_{Bn}$, and the real part $P\hat{}_{An}$ and imaginary part $P\hat{}_{Bn}$ of the system transfer function; subtracts command compensating current $I_{An}^*$ and $I_{Bn}^*$ obtained through pulsation extracting filter $G_F$, respectively, from the real part $I\hat{}_{An}$ and imaginary part $I\hat{}_{Bn}$ of the estimated current, and thereby determines estimated periodic disturbance current real part $dI\hat{}_{An}$ and imaginary part $dI\hat{}_{Bn}$ to cancel the periodic disturbance current.

3 Claims, 5 Drawing Sheets

TORQUE RIPPLE SUPPRESSION CONTROL APPARATUS AND TORQUE RIPPLE SUPPRESSION CONTROL METHOD FOR ROTATING ELECTRICAL MACHINE

TECHNICAL FIELD

In a torque control system or apparatus of a rotating electric machine such as motor, the present invention relates to control apparatus and control method for automatically suppressing torque ripple (torque pulsation) in the rotating electric machine, and more specifically to a periodical disturbance suppression control with a periodical disturbance observer.

BACKGROUND ART

A motor produces torque ripple (torque pulsation) in principle, and thereby causes various problems such as vibration, noise, adverse influence on ride quality and electrical and mechanical resonances. Especially, in the case of an interior PM motor (IPMSM) spreading wide recently, there are produced cogging torque ripple and reluctance torque ripple compositely. As a countermeasure, various methods are under study and investigation, such as a countermeasure method of superposing a compensation current for cancelling torque ripple, on a torque command.

However, wariness or concern persists about adverse influence of analytical error, for example, in a method of performing a feedforward compensation by using a mathematical analysis model. Moreover, in a method of storing or memorizing a result of feedback learning control at a steady operating point, and performing feedforward compensation, online compensation is difficult because of time required for adjusting a control parameter adequately at each operation point. Furthermore, in a method of reducing current ripple, optimum suppression is not guaranteed in terms of torque ripple. Moreover, a torque ripple observer compensation method is under investigation. However, the torque ripple observer compensation method is still insufficient in validation for characteristic in speed varying operation, and online feedback suppression.

As to the above-mentioned problems, a feedback suppression control method by a shaft torque meter is already proposed, by the inventor of the present application and others (cf. a non-patent document 1, for example), in order to accurately suppress torque ripple which is a principal cause of electrical-mechanical resonance. In this control method, a control system is built to compensate for each of pulsation frequency components with attention being paid to the periodicity of torque ripples, and a function is provided for automatically adjusting a parameter so as to conform to or rapidly respond to operating condition change by using a result of system identification. This control method is explained below in detail.

(1) Basic Structure of Torque Ripple Suppressing Control Apparatus

FIG. 2 is a basic structure view of a torque ripple control apparatus of an earlier technology. The apparatus of this figure is applied to a system for driving a load with a motor.

A motor 1 becoming a source of torque ripple is connected with a load or load device 2 of some type, by a shaft 3. Its shaft torque is measured by a torque meter 4, and inputted into a torque ripple suppression device 5. Furthermore, information on a rotor position of the motor (phase) is inputted by using a rotation position sensor 6 such as a rotary encoder. Torque ripple suppression device 5 is provided with a torque pulsation suppressing means or device and configured to supply, to an inverter 7, a command or command value obtained by adding a toque pulsation compensating current to a command current produced in accordance with a torque command (or a speed command). In the example of FIG. 2, in consideration of current vector control performed by inverter 7, the torque ripple suppressing device 5 supplies command d-axis and q-axis currents id* and iq* or d-axis and q-axis current command values id* and iq* in a rotation coordinate system (orthogonal d and q axes) synchronous with the rotation of the motor.

It is known that the torque ripple (torque pulsation) is generated periodically in dependence on the rotor position, due to the structure of the motor. Therefore, the system uses a means or device for extracting torque ripple frequency component or components in synchronism with the motor rotation, and converts the torque ripple of an arbitrary order n into cosine and sine coefficients $T_{An}$ and $T_n$ [Nm]. Although there is a strict measuring means or device, such as Fourier transform, for measuring a torque ripple frequency component, the system can extract torque ripple frequency component by passage through a low-pass filter in a harmonic rotation coordinate system of a single phase using, as a reference, the rotational phase $\theta$ [rad] when weight is given to the ease in computation.

Torque ripple suppression device 5 performs the torque ripple suppression control using the above-mentioned cosine and sine coefficients $T_{An}$ and $T_{Bn}$, and produces cosine/sine coefficients $I_{An}$, $I_{Bn}$ [ampere] of a compensating current iqc* [ampere] of an arbitrary frequency component. Conversion into the compensating current iqc* is performed by using the same rotation phase $\theta$ at the time of conversion, according to a following equation (2). This compensating current is superposed on the q-axis current command and a normal vector control is performed.

[Math 1]

$$iqc^* = I_{An}^* \cdot \cos(n\theta) + I_{Bn}^* \cdot \sin(n\theta) \qquad (2)$$

FIG. 3 is a control block diagram of the torque ripple suppression device determining the cosine and sine coefficients $T_{An}$ and $T_{Bn}$ of the torque ripple from the above-mentioned detected shaft torque $T_{det}$ and the rotation phase $\theta$, determining the compensating current cosine and sine coefficients $I_{An}$ and $I_{Bn}$ from these quantities and the rotational speed $\omega$, and thereby determining the compensating current to suppress periodic torque disturbance. Symbols in the figure have following meanings.

T*: command torque or torque command value, Tdet: detected shaft torque or shaft torque detected value, $T_{An}$: nth order torque pulsation extracted component (cosine coefficient), $T_{Bn}$: nth order torque pulsation extracted component (sine coefficient), $\omega$: detected rotational speed or number of revolutions, $\theta$: detected rotational phase, iqc*: torque ripple compensating current, id: detected d-axis current, id*: command d-axis current, iq: detected q-axis current, iq*: command q-axis current, iu, iv, iw: u, v, w phase currents, iqo*: command q-axis current (before superposition of the compensating current), $I_{An}$: nth order compensating current cosine coefficient, $I_{Bn}$: nth order compensating current sine coefficient, and abz: rotation sensor signal. The letter n in the subscript represents an nth order torque ripple component.

In FIG. 3, a command converting section 11 converts the command torque T* into command d-axis and q-axis currents Id* and Iqo* in the rotation dq coordinate system in the vector control. In general, use is made of a conversion mathematical expression or table for achieving a greatest torque/current control. A current vector control section 12 functions to suppress torque pulsation by using, as command q-axis current iq*, a current obtained by superposition of torque pulsation compensating current iqc* on the command q-axis current Iqo. In the example of FIG. 3, the compensating current Iqc is superposed on command the q-axis current. However, it is optional to superpose the compensating current on the d-axis current or on both the d-axis and q-axis currents. Alternatively, in the system in which interference between the d-axis and q-axis currents is not problematical, it is possible to superpose a torque pulsation compensating signal directly on the command torque.

The current vector control section 12 performs operation of the current vector control in the d-axis and q-axis of the general orthogonal rotation coordinate system, and drives a load device 14 by driving a motor (IPMSM) 13 in the vector control mode. A coordinate transforming section 15 receives the three phase ac current iu, iv and iw detected by a current sensor 16, and the motor rotational phase θ, and produces, by conversion, currents id and iq of a d-axis and q-axis orthogonal rotation coordinate system synchronous with the motor rotation coordinates. A rotation phase/speed detector section 17 performs conversion from a rotation sensor signal abz of a rotational position sensor 18 such as an encoder, into information on the rotational speed ω and rotational phase θ.

A torque pulsation frequency component extracting section 19 extracts a periodic torque disturbance for each of pulsation frequency components, from the detected shaft torque $T_{det}$ detected by a shaft torque meter 20, and the rotational phase θ. Fourier transformation is a typical extracting means. Although a method for extracting pulsation component can be chosen arbitrarily, weight is given to ease in computation and an approximate Fourier transformation expressed by equations (3)-(5) is performed by multiplying the detected shaft torque Tdet [Nm], by nth order cosine wave and sine wave based on the rotation phase θ, and applying a low-pass filter to each. This is referred to as a torque ripple synchronous coordinate transformation.

[Math 2]

$$\begin{cases} T^n_{dctA}(t) = T_{det}(t) \cdot \cos n\theta \\ T^n_{dctB}(t) = T_{det}(t) \cdot \sin n\theta \end{cases} \quad (3)$$

$$\begin{cases} T^n_{dctA}(s) = \mathcal{L}[T^n_{dctA}(t)] \\ T^n_{dctB}(s) = \mathcal{L}[T^n_{dctB}(t)] \end{cases} \quad (4)$$

$$\begin{cases} T_{An} = 2 \cdot G_F(s) \cdot T_{detAn}(s) = 2 \cdot \frac{\omega_f}{s + w_f} \cdot T_{dctAn}(s) \\ T_{Bn} = 2 \cdot G_F(s) \cdot T_{detBn}(s) = 2 \cdot \frac{\omega_f}{s + w_f} \cdot T_{dctBn}(s) \end{cases} \quad (5)$$

$\mathcal{L}$: Laplace transform, $G_F$: pulsation extracting filter, ωf: pulsation extracting low-pass filter cutoff frequency [rad/s], s: Laplace operator.

A torque ripple suppression control section 21 performs a torque ripple suppression control to a component of each order by using $T_{An}$ and $T_{Bn}$ extracted and converted according to the equations (3)~(5), and generates a cosine coefficient $I_{An}^*$ [A] and a sine coefficient $I_{Bn}^*$ [A] of an nth frequency component $I_{qcn}^*$ [A] of a compensating current $i_{qc}^*$ [A]. Conversion to the nth compensating current $I_{qcn}^*$ is achieved by calculation using the same rotational phase θ as the rotation phase at the time of the torque ripple synchronous coordinate transformation, as the equation (2).

The command torque T* [Nm] is converted into the command d-axis and q-axis currents $i_d^*$ and $i_{q0}^*$ achieving the greatest torque/current control, and the vector control is performed by superposing a resultant value $i_{qc}^*$ of the compensating current of each order generated according to the equation (2), on command q-axis current $i_{q0}^*$. Basically, calculating operations performed in the torque ripple suppression control device are shaft torque pulsation component extraction, torque ripple suppression, and compensating current signal generation. Other operations are performed in a general inverter.

As typical form of the torque ripple suppression control section 21, it is possible to employ a periodic disturbance observer compensating method or a compensating current Fourier coefficient learning control method.

A compensating current generating section 22 generates the command compensating current $i_{qc}^*$ according to the equation (2), and superposes the command compensating current $i_{qc}^*$ on the command q-axis current.

(2) System Identification

The structure of the system shown in FIG. 2 forms a multi inertial axes torsional resonance system, with moments of inertia of PM motor 1, load device 2, torque meter 4, and coupling 3, etc. When the sensed shaft torque is fed back, a suppression control parameter must be determined adequately in accordance with operating condition because of the existence of a plurality of resonance•anti-resonance frequencies. Since a long learning time of the control parameter has a possibility of increasing the phenomena of electric and mechanical resonances, a rapid automatic adjusting function is required.

Therefore, in order to introduce a variable nominal control parameter adaptable to rotational speed change, the system disclosed in the non-patent document 1 identifies a system transfer function from the output to the input of the torque ripple suppression device 5 of FIG. 2, that is a frequency transfer function from the command compensating current iqc* to the detected torque $T_{det}$ of the shaft torque detector 4 in FIG. 3. Although it is possible to choose the system identifying method arbitrarily, FIG. 4 shows the result of nonparametric estimation of the frequency transfer function from a ratio of power spectrum densities of input and output by measuring the detected shaft torque $T_{det}$ with a computation cycle of 100 μs for 20 sec when Gaussian noise signal is provided to iqc* in a closed loop (a characteristic of an actual machine including the mechanical system, inverter current response, torque meter response, dead time, etc.). FIG. 4 further shows the result of parametric identification in the case of approximation with a four inertia system from tendency of the frequency transfer function. Although there are various optimization methods for approximation, employed is a method of evaluating error of amplitude characteristic up to 1 kHz in a frequency region, and performing a constrained nonlinear minimization (sequential quadratic programming method).

The system shown in FIG. 3 extracts only an arbitrary frequency transfer function from the result of identification of FIG. 4, in order to build a control system with coordinates synchronous with the torque ripple frequency. In the steady state, the amplitude and phase transfer functions of a system synchronizing with the torque ripple frequency can be expressed by a one-dimensional complex vector. Therefore, a system characteristic $P_{sys}$ in the control system of FIG. 3 is defined by a following equation (6).

[Math 3]

$$P_{SYS} = P_{Am} + P_{Bm} \cdot i \quad (6)$$

$P_{Am}$: real part of the system characteristic, $P_{Bm}$: imaginary part of the system characteristic, m: a frequency element number in a system identification table.

When, for example, the system characteristic in the range of 1~1000 [Hz] is expressed by equation (6) for each of intervals of 1 Hz, it is possible to form a system identification table of 1000 elements of complex vectors. Use in the control system is always limited to only one complex vector. In accordance with a rotation speed change (a change in the torque ripple frequency), the system reads $P_{Am}$ and $P_{Bm}$ instantaneously from the identification table, and applies an identification result obtained by conversion to a complex vector by linear interpolation, to the suppression control. To define the axes of the rear part and imaginary part based on the rotational phase, the cosine coefficient in equation (5) corresponds to the real part component, and the sine coefficient corresponds to the imaginary part component.

(3) Compensating Current Fourier Coefficient Learning Control Method

This is a torque ripple suppression control method explained as a method 1 in the non-patent document 1. In this method, a Fourier coefficient of a torque ripple frequency component is determined, and, from this, the compensating current iqc* is determined by calculation of the equation (2). This control method expresses the system transfer function of a frequency component synchronous with the torque ripple frequency in the form of a one dimensional complex vector, and extracts the real and imaginary parts of the torque ripple of an arbitrary frequency component by Fourier transformation etc. A feedback suppression control system is formed by applying the cosine and sin Fourier coefficients to the real and imaginary parts of the complex vector.

The compensating current coefficient is determined by an I-P (proportional•integral) learning control method. Proportional•integral gain is determined so that a closed loop characteristic of the I-P suppression control system matches a pole assignment of an arbitrary standard system reference model by model matching method. Moreover, these quantities act to adapt a parameter automatically by the use of the result of the system identification and the rotational speed information, and hence facilitate the implementation to a multi inertia resonance system.

At an arbitrary steady operating point (steady torque, steady rotational speed), the amplitude and phase of the compensating current at the time of completion of the suppression are stored. This operation is performed at a plurality of operating points, and thereby implementation is achieved in the form of a two dimensional table of the torque and the rotational speed. In this case, it is possible to input the torque and rotational speed information into the table, to generate the compensating current from the amplitude and phase data of the compensating current read from the table, and thereby perform a feed forward suppression.

(4) Periodic Disturbance Observer Compensating Method

This method is a torque ripple suppression control method recited as a method 2 in the non-patent document 1. The control parameter automatic adjusting process in the abovementioned compensating current Fourier coefficient learning control method becomes lower in quickness of the response to a variable speed operation because disturbance is suppressed through adjustment of I-P control gain. Therefore, it is recommended to arrange the result of learning in the form of a table, and to use the table in feed forward suppression.

By contrast, the periodic disturbance observer compensating method estimates the torque ripple disturbance directly by using the idea of a periodic disturbance observer. Therefore, this method provides improvement in the problem of the response quickness. Accordingly, this method makes it possible to suppress torque ripple in an always online feedback mode even for a system having a varying speed and load variation. Moreover, the method facilitate implementation to the multi inertia resonance system by providing a function of automatically adjusting an inverse model of the periodic disturbance observer by using the result of system identification expressing with a one-dimensional complex vector like the compensating current Fourier coefficient learning control method.

FIG. 5 is a calculation block diagram of the torque ripple suppression control by the periodic disturbance observer. FIG. 5 shows a periodic disturbance observer section 31, a torque ripple extracting section 32 and an actual system 33. In this figure, $dI_{An}$*: command nth order periodic disturbance current real part (cosine coefficient) (command value), $dI_{Bn}$*: command nth order periodic disturbance current imaginary part (sine coefficient) (or command value), iqcn: nth order compensating current, $dI_{An}$: estimated nth order periodic disturbance real part (cosine) component (estimated value), $dI_{Bn}$: estimated nth order periodic disturbance imaginary part (sine) component (estimated value), $I_{An}$: nth order compensating current real part (cosine coefficient), and $I_{Bn}$: nth order compensating current imaginary part (sine coefficient).

Since FIG. 5 shows only the control system synchronous with the torque ripple frequency, the transfer function of the actual system is represented by a one-dimensional complex vector. That is, the actual system is represented by a following equation (7), and an equation (8) is the result of the system identification. Although the symbol "^" is added on top of a base letter P in estimated quantities in the equation (8) and subsequent equations, this symbol is expressed as "P^" in the description.

[Math 4]

$$P_{sys} = P_{An} + P_{Bn} \cdot i \qquad (7)$$

$$\hat{P}_{sys} = \hat{P}_{An} + \hat{P}_{Bn} \cdot i \qquad (8)$$

$P_{An}$: system real part of the nth order torque ripple frequency component, $P_{Bn}$: system imaginary part of the nth order torque ripple frequency component, $\hat{P}_{An}$: estimated system real part of the nth order torque ripple frequency component, and $\hat{P}_{Bn}$: estimated system imaginary part of the nth order torque ripple frequency component.

A low pass filter transfer function of the torque ripple extracting section shown in FIG. 5 is given by a following equation (9), from the equation (5).

[Math 5]

$$G_F = \frac{1}{(1/wf)s + 1} \qquad (9)$$

The system of FIG. 5 has a structure identical to a general disturbance observer of an earlier technology. However, attention is focused only on the periodic disturbance. Therefore, the system characteristic is expressed by a one-dimensional complex vector as in equation (7), and the inverse system $\hat{P}_{sys}^{-1}$ of the observer section can be expressed simply by the inverse of equation (8) by using the result of the system identification.

[Math 6]

$$\hat{P}_{SYS}^{-1} = \frac{1}{(\hat{P}_{An} + \hat{P}_{Bn} \cdot i)} \quad (11)$$

After the complex vector operation, the periodic disturbance observer estimates the real part component and imaginary part component of the periodic disturbance (torque ripple) through observer filter, respectively. The estimated periodic disturbance real part $dI_{An}$ and estimated periodic disturbance imaginary part $dI_{Bn}$ are fed as compensating current so as to cancel the disturbance component as shown in FIG. 5. Normally, it is possible to suppress disturbance current of the frequency component by reducing the command periodic disturbance currents $I_{An}^*$ and $I_{Bn}^*$ to zero (0).

PRIOR ART DOCUMENTS

Non-Patent Documents

Non-patent document 1: Tadano et. al. "A study on torque ripple suppression control that focuses attention on the periodic disturbance of permanent magnet synchronous motor" 2009 annual conference of I.E.E. Japan, Industry Application Society, I-615~618, Aug. 31~Sep. 2, 2009 (H21), Mie University.

SUMMARY OF THE INVENTION

Problem to be Solved by the Invention

In an apparatus for sensing torque ripple and restraining the torque ripple with a feedback control over an entire frequency band, in general, a feedback control response deteriorates by influence of the calculation dead time in a high frequency range, the performance for restraining disturbance becomes lower in the high frequency range, and the generation of a desired compensating current becomes difficult.

On the other hand, the periodic learning method of determining with the above-mentioned I-P (proportional, integral) learning control method generates a sine weave and a cosine wave of a frequency equaling the frequency of the periodic disturbance, and then adjusts the sine and cosine coefficients (equivalent to the amplitude and phase). Therefore, this system can treat a high frequency disturbance more easily as compared to the control apparatus for generating the compensating current in a single uniform manner over the entire frequency range, and hence has a possibility of providing improvement in the periodic disturbance suppressing performance. Moreover, this method can suppress torque ripples of a plurality of orders simultaneously with an arrangement including a plurality of torque ripple suppressing apparatus arranged in parallel for each of the orders.

In FIG. 3, to form the control system with a coordinate system synchronizing with the torque ripple frequency, a system transfer function is identified from the command torque ripple compensating current $I_{qc}^*$ to the detected shaft torque Tdet. From the result of the system identification, the system extracts only an arbitrary frequency transfer function or a transfer function of an arbitrary frequency, and performs the feedback control. Since, in the steady state, the amplitude•frequency transfer function of a system synchronous with the torque ripple frequency can be represented by a one-dimensional complex vector, the frequency transfer function of the actual system can be defined as an equation (12) with a complex vector P(jω) with respect to the rotational speed ω.

[Math 7]

$$\vec{P(j\omega)} = P_A(\omega) + j \cdot P_B(\omega) \quad (12)$$

$P_A(\omega)$: real part of the actual system, $P_B(\omega)$: imaginary part of the actual system.

In the non-patent document 1, to form the control system with the torque ripple synchronizing coordinates, only a frequency transfer function of an arbitrary nth order component is extracted from the equation (12), and an actual system of the torque ripple synchronizing coordinates is set as an equation (13). That is, attention is paid on the capability of representing the amplitude•phase characteristic of a system of an arbitrary nth order component, with a simple one-dimensional complex vector Pn. Like the equations (2)~(5), the axes of the real and imaginary parts are defined with reference to the rotation phase θ, the cosine coefficient corresponds to the real part component and the sine coefficient corresponds to the imaginary part component.

[Math 8]

$$\vec{P}_n = P_{An} + jP_{Bn} \quad (13)$$

$P_{An}$: real part of the actual system nth order component, $P_{Bn}$: imaginary part of the actual system nth order component.

The system identification result in the control system of FIG. 3 can be defined as an equation (14) with a one-dimensional complex vector, likewise.

[Math 9]

$$\vec{\hat{P}}_n = \hat{P}_{An} + j\hat{P}_{Bn} \quad (14)$$

$\hat{P}_{An}$: real part of the nth order component of the identification result, $\hat{P}_{Bn}$: imaginary part of the nth order component of the identification result.

When, for example, the system identification result in the range of 1~1000 Hz is expressed by a complex vector for each of intervals of 1 Hz, it is possible to build a table including 1000 elements each of which is a one-dimensional complex vector. It is also possible to express the identification result by an approximation formula.

Thus, even if the system is complicated, a system model is always a simple one-dimensional complex vector, and it is possible to deal with a variable speed operation easily by changing a lookup value or referring value in the equation (14) instantaneously in response to change in the motor rotation speed ω (torque ripple frequency change).

As shown in FIG. 3, for the torque ripple suppression control, the system performs a harmonic rotational coordinate transformation of a higher harmonic wave rotating at an integral multiple of a fundamental wave component frequency of a current flowing through the motor, extracts a higher harmonic current of the component, and performs the suppression for reduction to zero with an I-P (proportional•integral) control device provided in the current vector control section 12. In this case, the system treats a speed electromotive force of the harmonic wave as a disturbance, forms a disturbance observer to estimate the disturbance, adds to the current command on the higher harmonic rotational coordinate system, and thereby suppresses the higher harmonic current. With this method, the system can suppress the harmonic current flowing through the motor. However, this method is unable to always suppress the torque pulsation accurately. Moreover, this method is not suited to complicated electric mechanical characteristics such as the multi inertia system and inverter response.

For a periodic disturbance suppression with a periodic disturbance observer, an object of the present invention is to provide torque ripple suppression control apparatus and control method for a rotating electric machine, to treat a complicated electric mechanical characteristic such as a multi inertia system and inverter response, and suppress torque ripple accurately.

Means for Solving the Problem

In order to solve the above-mentioned problem, according to the present invention, a periodic disturbance observer determines the real part $\hat{I}_{An}$ and imaginary part $\hat{I}_{Bn}$ of the estimated current including the periodic disturbance, from value or values of identification identifying a system transfer function of an nth order torque ripple frequency component from the command torque to the detected torque value, with a one-dimensional complex vector having a real part $\hat{P}_{An}$ and an imaginary part $\hat{P}_{Bn}$, a cosine coefficient $T_{An}$, a sine coefficient $T_{Bn}$, and the real part $\hat{P}_{An}$ and imaginary part $\hat{P}_{Bn}$ of the system transfer function; subtracts command compensating current $I_{An}*$ and $I_{Bn}*$ obtained through pulsation extracting filter $G_F$, respectively, from the real part $\hat{I}_{An}$ and imaginary part $\hat{I}_{Bn}$ of the estimated current, and thereby determines estimated periodic disturbance current real part $dI\hat{}_{An}$ and imaginary part $dI\hat{}_{Bn}$ to cancel the periodic disturbance current. The characteristic feature resides in following apparatus and method.

(1) A torque ripple suppression control apparatus for a rotating electric machine, arranged to convert a command torque or command speed of the rotating electric machine system, into a command d-axis current or d-axis current command value and a command q-axis current or q-axis current command value in a rotating coordinate system in a vector control, to perform modeling to form a model representing a frequency characteristic of a control system of the rotating electric machine, by system identification, with a complex vector of an arbitrary frequency component, to estimate real and imaginary parts of a torque ripple of the arbitrary frequency component with a periodic disturbance observer, using this model, and to superpose a feedback compensating current on the command d-axis and q-axis currents so as to suppress this periodic disturbance, the torque ripple suppression control apparatus comprising:

a torque ripple extracting section to determine a torque pulsation cosine coefficient $T_{An}$ and a torque pulsation sine coefficient $T_{Bn}$ of torque pulsation of an nth order frequency component included in the torque ripple of the rotating electric machine system, from a detected shaft torque Tdet of the rotating electric machine, a pulsation extracting filter $G_F$, and a rotational phase θ;

a periodic disturbance observer to estimate an nth order compensating current cosine coefficient $\hat{I}_{An}$ and an nth order compensating current sine coefficient $\hat{I}_{Bn}$ of the torque ripple, from the cosine coefficient $T_{An}$ and sine coefficient $T_{Bn}$, and a rotational speed ω of the rotating electric machine; and a compensating current generating section to set the cosine coefficient $\hat{I}_{An}$ and sine coefficient $\hat{I}_{Bn}$ as command torque ripple compensating currents, and to determine a feedback compensating current for suppressing a periodic disturbance of the rotating electric machine, from the cosine coefficient $\hat{I}_{An}$ and sine coefficient $\hat{I}_{Bn}$ and the rotational phase θ of the rotating electric machine;

the periodic disturbance observer including, an estimating means or section to estimate a transfer function of the rotating electric machine for an nth torque ripple frequency component from a command torque to a detected torque, by identification, with a one-dimensional complex vector having an nth order component real part $\hat{P}_{An}$ and an nth order component imaginary part $\hat{P}_{Bn}$, a determining means or section to determine an estimated current real part $\hat{I}_{An}$ and an estimated current imaginary part $\hat{I}_{Bn}$ of an estimated current including the periodic disturbance, from the cosine coefficient $T_{An}$ and sine coefficient $T_{Bn}$ and the nth order component real part $\hat{P}_{An}$ and imaginary part $\hat{P}_{Bn}$ by calculation of following expression,

[Math 10]

$$\begin{cases} \hat{I}_{An} = \dfrac{\hat{P}_{An} T_{An} - \hat{P}_{Bn} T_{Bn}}{\hat{P}_{An}^2 + \hat{P}_{Bn}^2} \\ \hat{I}_{Bn} = \dfrac{\hat{P}_{Bn} T_{An} + \hat{P}_{An} T_{Bn}}{\hat{P}_{An}^2 + \hat{P}_{Bn}^2} \end{cases}$$

a deriving means or section to derive an estimated periodic disturbance current real part $dI\hat{}_{An}$ and an estimated periodic disturbance current imaginary part $dI\hat{}_{Bn}$ to cancel a periodic disturbance current, by subtracting the compensating current commands $I_{An}*$ and $I_{Bn}*$ through the pulsation extracting filter $G_F$, respectively, from the estimated current real part $\hat{I}_{An}$ and the estimated current imaginary part $\hat{I}_{Bn}$ of the estimated current.

(2) The torque ripple suppression control apparatus characterized in that the pulsation extracting filter $G_F$ is in the form of a first order low-pass filter or a higher order low-pass filter.

(3) A torque ripple suppression control method for a rotating electric machine, arranged to convert a command torque command or command speed of the rotating electric machine system, into a command d-axis current or d-axis current command value and a command q-axis current or q-axis current command value in a rotating coordinate system in a vector control, to perform modeling to form a model representing a frequency characteristic of a control system of the rotating electric machine, by system identification, with a complex vector of an arbitrary frequency component, to estimate a periodic disturbance by using the model, and to superpose a feedback compensating current on the command d-axis and q-axis currents so as to suppress this periodic disturbance, the torque ripple suppression control method wherein:

a torque ripple extracting section determines a torque pulsation cosine coefficient $T_{An}$ and a torque pulsation sine coefficient $T_{Bn}$ of torque pulsation of an nth order frequency component included in the torque ripple of the rotating electric machine system, from a detected shaft torque Tdet of the rotating electric machine, a pulsation extracting filter $G_F$, and a rotational phase θ;

a periodic disturbance observer estimates an nth order compensating current cosine coefficient $\hat{I}_{An}$ and an nth order compensating current sine coefficient $\hat{I}_{Bn}$ of the torque ripple, from the cosine coefficient $T_{An}$ and sine coefficient $T_{Bn}$, and a rotational speed ω of the rotating electric machine;

a compensating current generating section sets the cosine coefficient $\hat{I}_{An}$ and sine coefficient $\hat{I}_{Bn}$ as command torque ripple compensating currents, and determines a feedback compensating current for suppressing a periodic disturbance of the rotating electric machine, from the cosine coefficient $\hat{\Gamma}_{An}$ and sine coefficient $\hat{\Gamma}_{Bn}$ and the rotational phase θ of the rotating electric machine;

the periodic disturbance observer is configured, to estimate a transfer function of the rotating electric machine for an nth torque ripple frequency component from a command torque to a detected torque, by identification, with a one-dimensional complex vector having an nth order component real part $\hat{P}_{An}$ and an nth order component imaginary part $\hat{P}_{Bn}$, to determine an estimated current real part $\hat{I}_{An}$ and an estimated current imaginary part $\hat{I}_{Bn}$ of an estimated current including the periodic disturbance, from the cosine coefficient $T_{An}$ and sine coefficient $T_{Bn}$ and the nth order component real part $\hat{P}_{An}$ and imaginary part $\hat{P}_{Bn}$ by calculation of following expression,

[Math 11]

$$\begin{cases} \hat{I}_{An} = \dfrac{\hat{P}_{An}T_{An} - \hat{P}_{Bn}T_{Bn}}{\hat{P}_{An}^2 + \hat{P}_{Bn}^2} \\ \hat{I}_{Bn} = \dfrac{\hat{P}_{Bn}T_{An} + \hat{P}_{An}T_{Bn}}{\hat{P}_{An}^2 + \hat{P}_{Bn}^2} \end{cases}$$

to derive an estimated periodic disturbance current real part $d\hat{I}_{An}$ and an estimated periodic disturbance current imaginary part $d\hat{I}_{Bn}$ to cancel a periodic disturbance current, by subtracting the compensating current commands $I_{An}^*$ and $I_{Bn}^*$ through the pulsation extracting filter $G_F$, respectively, from the estimated current real part $\hat{I}_{An}$ and the estimated current imaginary part $\hat{I}_{Bn}$ of the estimated current.

Effect of the Invention

As explained above, according to the present invention, the periodic disturbance observer determines the real part $\hat{I}_{An}$ and imaginary part $\hat{I}_{Bn}$ of the estimated current including the periodic disturbance, from value or values of identification identifying a system transfer function of an nth order torque ripple frequency component from the command torque to the detected torque value, with a one-dimensional complex vector having a real part $\hat{P}_{An}$ and an imaginary part $\hat{P}_{Bn}$, a cosine coefficient $T_{An}$, a sine coefficient $T_{Bn}$, and the real part $\hat{P}_{An}$ and imaginary part $\hat{P}_{Bn}$ of the system transfer function; subtracts command compensating current $I_{An}^*$ and $I_{Bn}^*$ obtained through pulsation extracting filter $G_F$, respectively, from the real part $\hat{I}_{An}$ and imaginary part $\hat{I}_{Bn}$ of the estimated current, and thereby determines estimated periodic disturbance current real part $d\hat{I}_{An}$ and imaginary part $d\hat{I}_{Bn}$ to cancel the periodic disturbance current. Therefore, the technique can handle a complicated electronic, mechanical characteristics such as a multi inertia system and inverter response, and suppress torque ripple accurately.

MODE(S) FOR CARRYING OUT THE INVENTION

Figure 1:
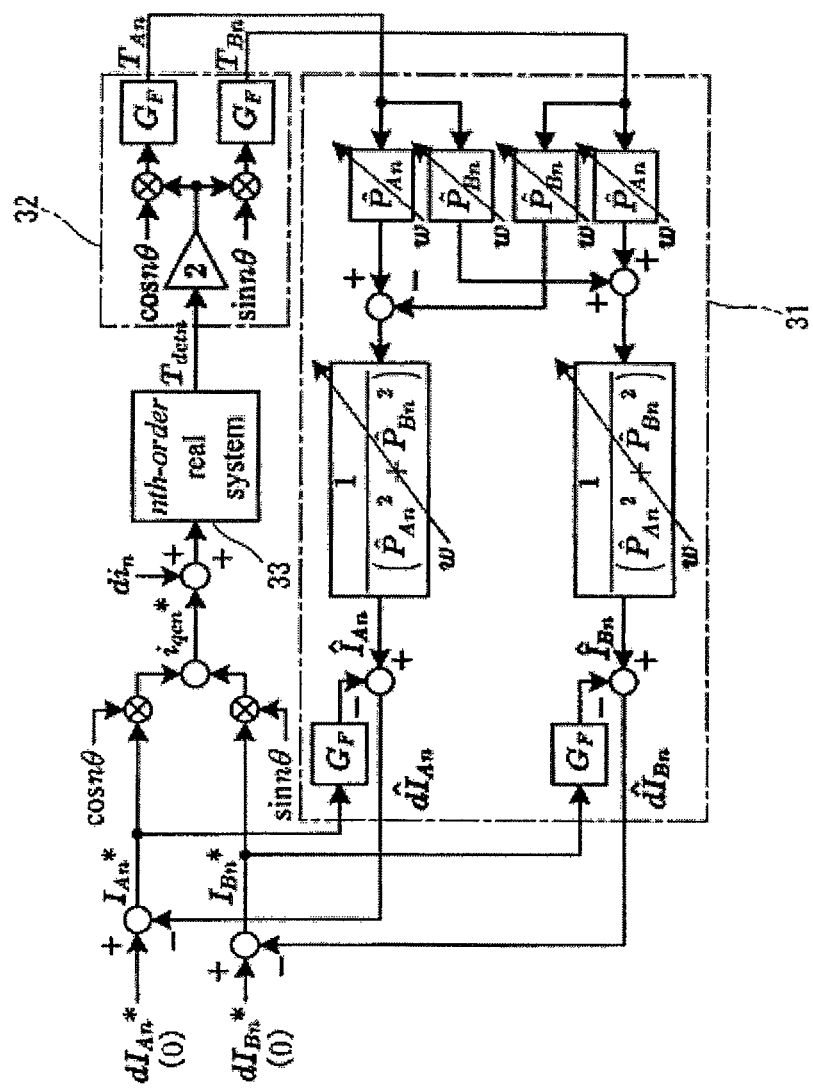
FIG. 1 is a calculation block diagram of a torque ripple suppression control with a periodic disturbance observer.
Figure 2:
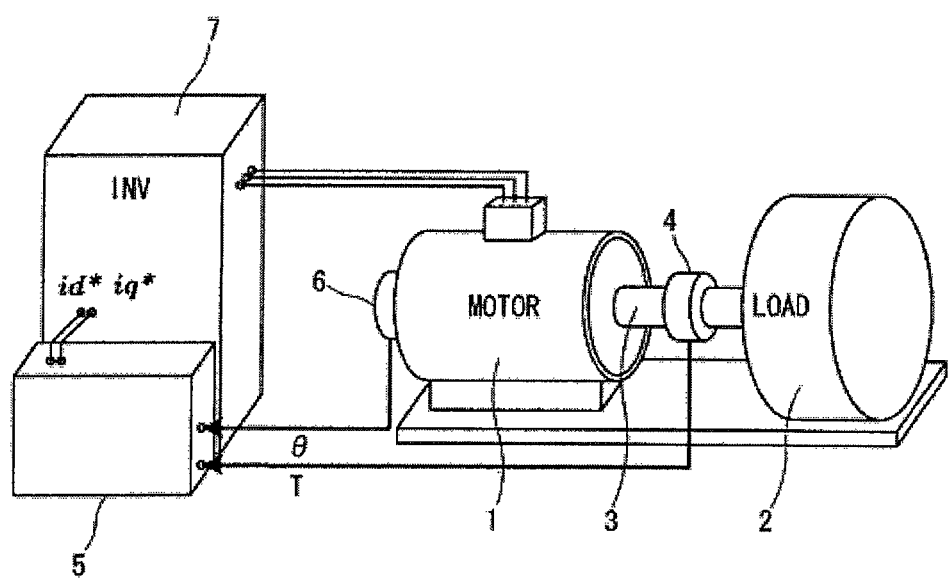
FIG. 2 is a basic structure view showing a torque ripple suppression control apparatus of earlier technology.

FIG. 1 is a calculation block diagram of a torque ripple suppression control with a periodic disturbance observer according to an embodiment of the present invention.

Figure 3:
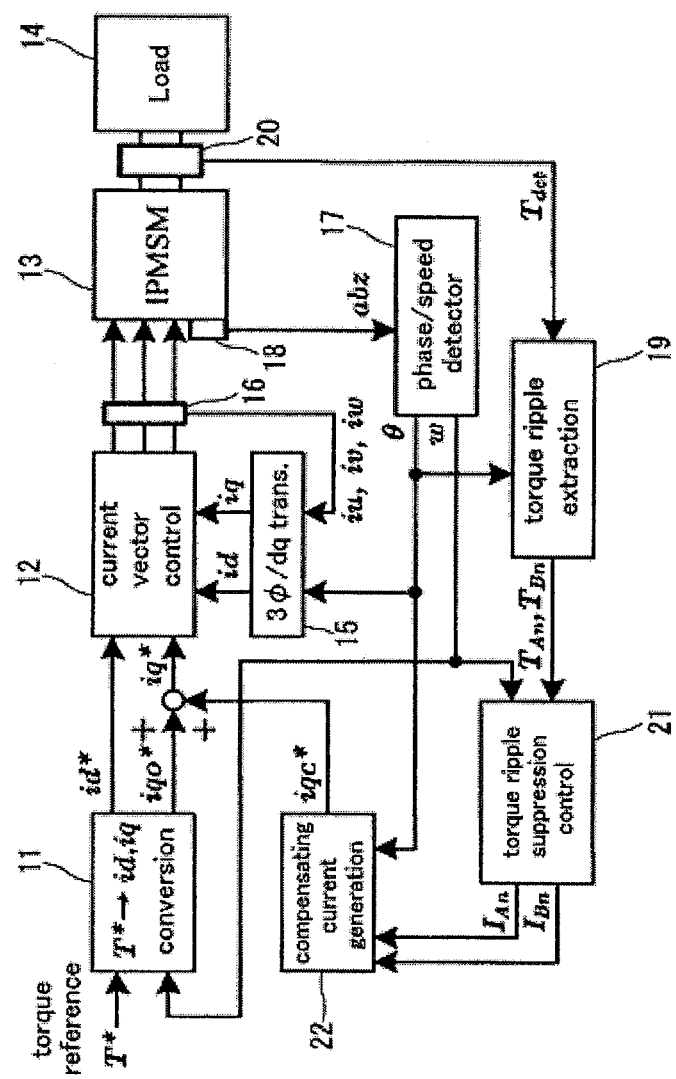
FIG. 3 is a control block diagram showing the torque ripple suppression apparatus of the earlier technology.
Figure 4:
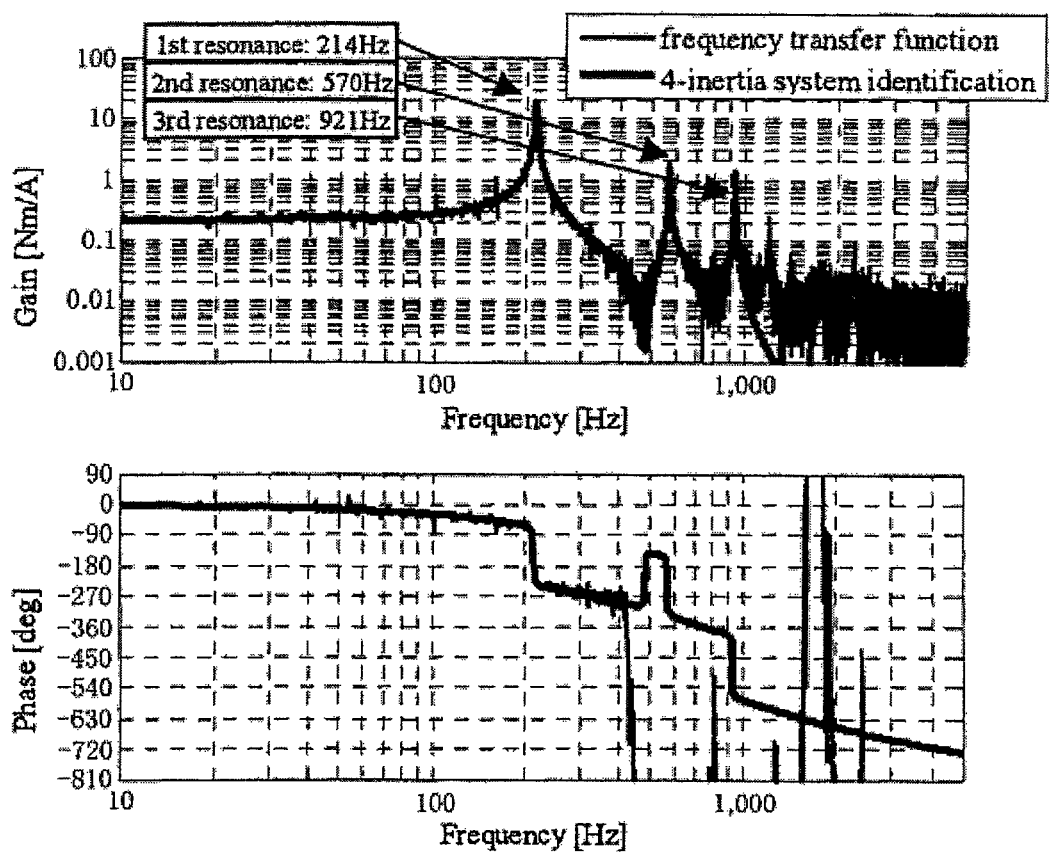
FIG. 4 shows system identification result by non-parametric estimation of a frequency transfer function.
Figure 5:
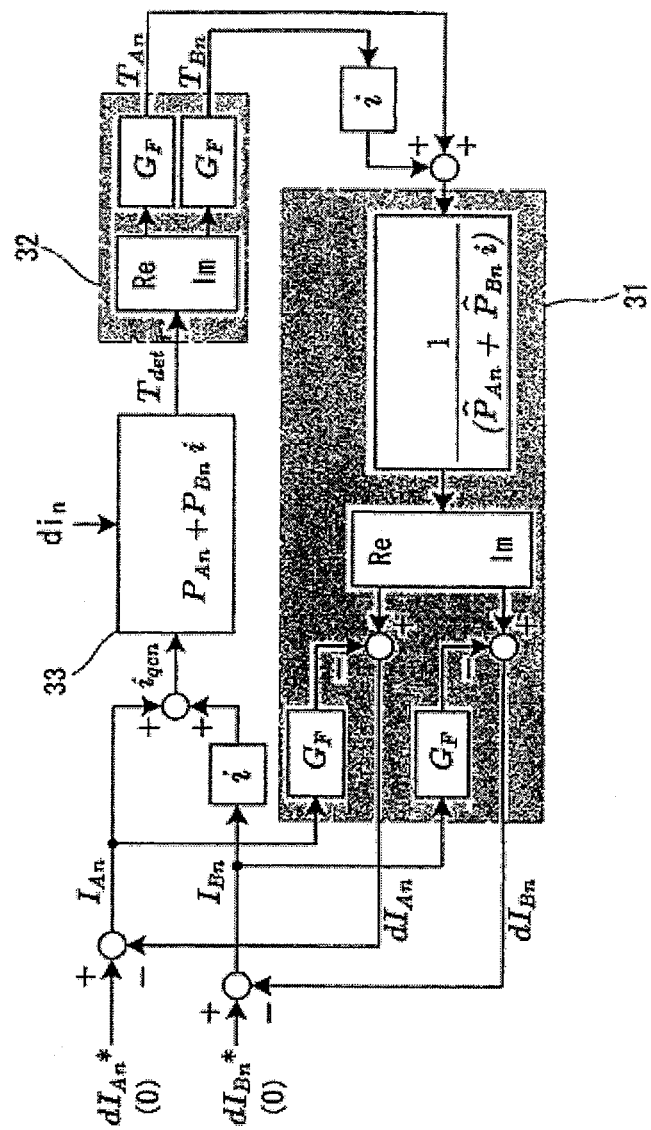
FIG. 5 is a calculation block diagram of a torque ripple suppression control with a periodic disturbance observer of earlier technology.

A torque ripple extracting section 32 (torque ripple pulsation frequency component extracting section 19 shown in FIG. 3) performs calculation based on the equations (3)~(5), and determines an nth order torque pulsation extraction component (cosine coefficient) $T_{An}$ and an nth order torque pulsation extraction component (sine coefficient) $T_{Bn}$. A periodic disturbance observer 31 (torque ripple suppression control section 21 shown in FIG. 3) is analogous to the periodic disturbance observer proposed by the non-patent document 1. However, in order to employ a structure with a torque ripple synchronizing coordinates, the periodic disturbance observer 31 uses an inverse characteristic of a one-dimensional complex vector expressed by equation (14), for a model of an inverse system for estimating a periodic disturbance current from a detected torque ripple.

First, an nth order compensating current $I_{qcn}^*$ shown by equation (2) is expressed by a complex vector. From Euler's formula, a following conversion is obtained.

[Math 12]

$$i_{qcn}^* = I_{An}^* \cos n\theta + I_{Bn}^* \sin n\theta \qquad (15)$$
$$= \dfrac{I_{An}^* - jI_{Bn}^*}{2} e^{jn\theta} + \dfrac{I_{An}^* + jI_{Bn}^*}{2} e^{-jn\theta}$$

Similarly, an nth order detected torque ripple $T_{det}$ is expressed as follows.

[Math 13]

$$T_{dcm} = T_{An} \cos n\theta + T_{Bn} \sin n\theta \qquad (16)$$
$$= \dfrac{T_{An} - jT_{Bn}}{2} e^{jn\theta} + \dfrac{T_{An} + jT_{Bn}}{2} e^{jn\theta}$$

By using the actual system of equation (13), it is possible to obtain a following relationship.

[Math 14]

$$T_{dcm} = \vec{P}_n \cdot i_{qcn}^* + \vec{P}_n \cdot di_n \qquad (17)$$

$di_n$: nth order periodic disturbance current.

The nth order periodic disturbance current $d_{in}$ is expressed as follows.

[Math 15]

$$di_n = dI_{An} \cos n\theta + dI_{Bn} \sin n\theta \qquad (18)$$
$$= \dfrac{dI_{An} - j \cdot dI_{Bn}}{2} e^{jn\theta} + \dfrac{dI_{An} + j \cdot dI_{Bn}}{2} e^{-jn\theta}$$

A following relationship is obtained by using the system identification result, substituting the equations (14), (15) into equation (17), and considering an extraction filter characteristic expressed by equation (5).

[Math 16]

$$T_{dctn} = 2G_F \cdot (\hat{P}_{An} + j\hat{P}_{Bn}) \cdot \left(\frac{I^*_{An} - jI^*_{Bn}}{2}e^{jn\theta} + \frac{I^*_{An} + jI^*_{Bn}}{2}e^{-jn\theta}\right) + \tag{19}$$
$$2G_F \cdot (\hat{P}_{An} + j\hat{P}_{Bn}) \cdot \left(\frac{dI_{An} - j \cdot dI_{Bn}}{2}e^{jn\theta} + \frac{dI_{An} + j \cdot dI_{Bn}}{2}e^{-jn\theta}\right)$$
$$= 2G_F \cdot \frac{(\hat{P}_{An}I^*_{An} + \hat{P}_{Bn}I^*_{Bn}) - j(\hat{P}_{An}I^*_{Bn} - \hat{P}_{Bn}I^*_{An})}{2}e^{jn\theta} +$$
$$2G_F \cdot \frac{(\hat{P}_{An}I^*_{An} - \hat{P}_{Bn}I^*_{Bn}) + j(\hat{P}_{An}I^*_{Bn} + \hat{P}_{Bn}I^*_{An})}{2}e^{-jn\theta} +$$
$$2G_F \cdot \frac{(\hat{P}_{An}dI_{An} + \hat{P}_{Bn}dI_{Bn}) - j(\hat{P}_{An}dI_{Bn} - \hat{P}_{Bn}dI_{An})}{2}e^{jn\theta} +$$
$$2G_F \cdot \frac{(\hat{P}_{An}dI_{An} - \hat{P}_{Bn}dI_{Bn}) + j(\hat{P}_{An}dI_{Bn} + \hat{P}_{Bn}dI_{An})}{2}e^{jn\theta}$$

A following relationship is obtained by taking out a complex Fourier coefficient nth order component $T_{Cn}$ (n>0) in equation (16).

[Math 17]

$$T_{Cn} = \frac{T_{An} - jT_{Bn}}{2}e^{jn\theta} \tag{20}$$
$$(n > 0)$$

Similarly, a following relationship is obtained by taking out a complex Fourier coefficient nth order component $T_{Cn}$ (n>0) in equation (19).

[Math 18]

$$T_{Cn} = 2G_F \cdot \frac{(\hat{P}_{An}I^*_{An} + \hat{P}_{Bn}I^*_{Bn} + \hat{P}_{An}dI_{An} + \hat{P}_{Bn}dI_{Bn}) -}{2} \tag{21}$$
$$\frac{j(\hat{P}_{An}I^*_{Bn} - \hat{P}_{Bn}I^*_{An} + \hat{P}_{An}dI_{Bn} - \hat{P}_{Bn}dI_{An})}{2}e^{jn\theta}$$
$$(n > 0)$$

It is possible to obtain a following relationship by comparing coefficients of the real and imaginary parts in the equation (20) and equation (21).

[Math 19]

$$\begin{cases} T_{An} = 2G_F\{\hat{P}_{An}(I^*_{An} + dI_{An}) + \hat{P}_{Bn}(I^*_{Bn} + dI_{Bn})\} \\ T_{Bn} = 2G_F\{\hat{P}_{An}(I^*_{Bn} + dI_{Bn}) - \hat{P}_{Bn}(I^*_{An} + dI_{An})\} \end{cases} \tag{22}$$

The real part $\hat{I}_{An}$ ($\approx I_{An}^* + dI_{An}$) and imaginary part $\hat{I}_{Bn}$ ($\approx I_{Bn}^* + dI_{Bn}$) of the estimated current including the periodic disturbance are derived from equation (22), as follows.

[Math 20]

$$\begin{cases} \hat{I}_{An} = \frac{\hat{P}_{An}T_{An} - \hat{P}_{Bn}T_{Bn}}{\hat{P}^2_{An} + \hat{P}^2_{Bn}} \\ \hat{I}_{Bn} = \frac{\hat{P}_{Bn}T_{An} + \hat{P}_{An}T_{Bn}}{\hat{P}^2_{An} + \hat{P}^2_{Bn}} \end{cases} \tag{23}$$

Then, as shown in FIG. 1, and equation (24), the estimated real part $d\hat{I}_{An}$ and imaginary part $d\hat{I}_{Bn}$ of the periodic disturbance current are determined by subtracting command compensating currents $I_{An}^*$ and $I_{Bn}^*$ through a pulsation extracting filter $G_F$, respectively, from the real part $\hat{I}_{An}$ and imaginary part $\hat{I}_{Bn}$ of the estimated current including the periodic disturbance.

[Math 21]

$$\begin{cases} d\hat{I}_{An} = \hat{I}_{An} - G_F \cdot I^*_{An} \\ d\hat{I}_{Bn} = \hat{I}_{Bn} - G_F \cdot I^*_{Bn} \end{cases} \tag{24}$$

Since the periodic disturbance current is estimated by equation (24), by using this estimated current, as shown in FIG. 1, the real part $I_{An}^*$ and imaginary part $I_{Bn}^*$ of the compensating current command are generated by subtracting from the command periodic disturbance currents $dI_{An}^*$ and imaginary part $dI_{Bn}^*$ (normally 0) so as to cancel the periodic disturbance current preliminarily.

A target response to the sensed torque ripple in this control system and a periodic disturbance response are derived, respectively, as in equations (25) and (26) by setting the system identification result as positive.

[Math 22]

$$\begin{cases} T_{An} = \frac{2\omega_f P_{An}}{s + 2\omega_f}dI^*_{An} + \frac{2\omega_f P_{Bn}}{s + 2\omega_f}dI^*_{Bn} \\ T_{Bn} = \frac{-2\omega_f P_{Bn}}{s + 2\omega_f}dI^*_{An} + \frac{2\omega_f P_{An}}{s + 2\omega_f}dI^*_{Bn} \end{cases} \tag{25}$$

[Math 23]

$$\begin{cases} T_{An} = \frac{(2\omega_f P_{An})s}{(s + \omega_f)(s + 2\omega_f)}dI_{An} + \frac{(2\omega_f P_{Bn})s}{(s + \omega_f)(s + 2\omega_f)}dI_{Bn} \\ T_{Bn} = \frac{(-2\omega_f P_{Bn})s}{(s + \omega_f)(s + 2\omega_f)}dI_{An} + \frac{(2\omega_f P_{An})s}{(s + \omega_f)(s + 2\omega_f)}dI_{Bn} \end{cases} \tag{26}$$

From these equations, it is understood that the pole assignment is determined by the cutoff frequency ωf of the pulsation extracting filter $G_F$, and it is possible to suppress the periodic disturbance current from a final-value theorem of equation (26).

In this embodiment, the system identification result is used as the basis, the inverse model of equation (23) has a characteristic varying in adaptation to the rotational speed ω (torque ripple frequency), and the control system parameter is adjusted automatically.

In the illustrated example of this embodiment, the pulsation extracting filter $G_F$ is a simplest first order low-pass filter. However, it is possible to suppress the periodic disturbance in the same manner by using a higher order low pass filter.

| Explanation of Reference Numerals | |
|---|---|
| 11 | command converting section |
| 12 | current vector control section |
| 13 | motor |
| 14 | load device |
| 15 | coordinate transforming section |
| 16 | current sensor |
| 17 | rotation phase/speed sensing section |
| 18 | rotational position sensor |
| 19 | torque pulsation frequency component extracting section |
| 20 | shaft torque detector |
| 21 | torque ripple suppression control section |
| 22 | compensating current generating section |
| 31 | periodic disturbance observer section |
| 32 | torque ripple extracting section |
| 33 | actual system |

The invention claimed is:

1. A torque ripple suppression control apparatus for a rotating electric machine, to convert a command torque or a command speed of a rotating electric machine system, into a command d-axis current and a command q-axis current in a rotating coordinate system in a vector control, to form a model representing a frequency characteristic of a control system of the rotating electric machine, by system identification, with a complex vector of an arbitrary frequency component, to estimate real and imaginary parts of a torque ripple of the arbitrary frequency component with a periodic disturbance observer, using this model, and to superpose a feedback compensating current on the command d-axis and q-axis currents so as to suppress the periodic disturbance, the torque ripple suppression control apparatus comprising:

a torque ripple extracting section to determine a torque pulsation cosine coefficient $T_{An}$ and a torque pulsation sine coefficient $T_{Bn}$ of torque pulsation of an nth order frequency component included in the torque ripple of the rotating electric machine system, from a detected shaft torque $T_{det}$ of the rotating electric machine, a pulsation extracting filter $G_F$, and a rotational phase $\theta$, a periodic disturbance observer to estimate an nth order compensating current cosine coefficient $\hat{I}_{An}$ and an nth order compensating current sine coefficient $\hat{I}_{Bn}$ of the torque ripple, from the cosine coefficient $T_{An}$ and sine coefficient $T_{Bn}$, and a rotational speed $\omega$ of the rotating electric machine; and a compensating current generating section to set the cosine coefficient $\hat{I}_{An}$ and sine coefficient $\hat{I}_{Bn}$ as command torque ripple compensating currents, and to determine a feedback compensating current for suppressing a periodic disturbance of the rotating electric machine, from the cosine coefficient $\hat{I}_{An}$ and sine coefficient $\hat{I}_{Bn}$ and the rotational phase $\theta$ of the rotating electric machine;

the periodic disturbance observer including, an estimating means to estimate a transfer function of the rotating electric machine for an nth order torque ripple frequency component from a command torque to a detected torque, by identification, with a one-dimensional complex vector having an nth order component real part $\hat{P}_{An}$ and an nth order component imaginary part $\hat{P}_{Bn}$, a determining means to determine an estimated current real part $\hat{I}_{An}$ and an estimated current imaginary part $\hat{I}_{Bn}$ of an estimated current including the periodic disturbance, from the cosine coefficient $T_{An}$ and sine coefficient $T_{Bn}$ and the nth order component real part $\hat{P}_{An}$ and nth order component imaginary part $\hat{P}_{Bn}$ by calculation of following expression,

[Math 24]

$$\begin{cases} \hat{I}_{An} = \dfrac{\hat{P}_{An} T_{An} - \hat{P}_{Bn} T_{Bn}}{\hat{P}_{An}^2 + \hat{P}_{Bn}^2} \\ \hat{I}_{Bn} = \dfrac{\hat{P}_{Bn} T_{An} + \hat{P}_{An} T_{Bn}}{\hat{P}_{An}^2 + \hat{P}_{Bn}^2} \end{cases}$$

and a deriving means to derive an estimated periodic disturbance current real part $dI^{\wedge}_{An}$ and an estimated periodic disturbance current imaginary part $dI^{\wedge}_{Bn}$ to cancel a period disturbance current, by subtracting the command compensating currents $I_{An}^*$ and $I_{Bn}^*$ through the pulsation extracting filter $G_F$, respectively, from the estimated current real part $\hat{I}_{An}$ and the estimated current imaginary part $\hat{I}_{Bn}$ of the estimated current.

2. The torque ripple suppression control apparatus for the rotating electric machine, as recited in claim 1, wherein the pulsation extracting filter $G_F$ is a first order low-pass filter or a higher order low-pass filter.

3. A torque ripple suppression control method for a rotating electric machine, to convert a command torque or a command speed of a rotating electric machine system, into a command d-axis current and a command q-axis current in a rotating coordinate system in a vector control, to form a model representing a frequency characteristic of a control system of the rotating electric machine, by system identification, with a complex vector of an arbitrary frequency component, to estimate a periodic disturbance by using this model, and to superpose a feedback compensating current on the command d-axis and q-axis currents so as to suppress the periodic disturbance:

wherein a torque ripple extracting section determines a torque pulsation cosine coefficient $T_{An}$ and a torque pulsation sine coefficient $T_{Bn}$ of torque pulsation of an nth order frequency component included in the torque ripple of the rotating electric machine system, from a detected shaft torque $T_{det}$ of the rotating electric machine, a pulsation extracting filter $G_F$, and a rotational phase $\theta$, wherein a periodic disturbance observer estimates an nth order compensating current cosine coefficient $\hat{I}_{An}$ and an nth order compensating current sine coefficient $\hat{I}_{Bn}$ of the torque ripple, from the cosine coefficient $T_{An}$ and sine coefficient $T_{Bn}$, and a rotational speed $\omega$ of the rotating electric machine;

wherein a compensating current generating section sets the cosine coefficient $\hat{I}_{An}$ and sine coefficient $\hat{I}_{Bn}$ as command torque ripple compensating current, and to determine a feedback compensating current for suppressing a periodic disturbance of the rotating electric machine, from the cosine coefficient $\hat{I}_{An}$ and sine coefficient $\hat{I}_{Bn}$ and the rotational phase $\theta$ of the rotating electric machine; and wherein the periodic disturbance observer, estimates a transfer function of the rotating electric machine for an nth order torque ripple frequency component from a command torque to a detected torque, by identification, with a one-dimensional complex vector having an nth order component real part $\hat{P}_{An}$ and an nth order component imaginary part $\hat{P}_{Bn}$, determines an estimated current real part $\hat{I}_{An}$ and an estimated current imaginary part $\hat{I}_{Bn}$ of an estimated current including the periodic disturbance, from the cosine coefficient $T_{An}$ and sine coefficient $T_{Bn}$ and the nth order component real part $\hat{P}_{An}$ and nth order component imaginary part $\hat{P}_{Bn}$ by calculation of a following expression,

[Math 25]

$$\begin{cases} \hat{I}_{An} = \dfrac{\hat{P}_{An}T_{An} - \hat{P}_{Bn}T_{Bn}}{\hat{P}_{An}^2 + \hat{P}_{Bn}^2} \\ \hat{I}_{Bn} = \dfrac{\hat{P}_{Bn}T_{An} + \hat{P}_{An}T_{Bn}}{\hat{P}_{An}^2 + \hat{P}_{Bn}^2} \end{cases}$$

and derives an estimated periodic disturbance current real part $d\hat{I}_{An}$ and an estimated periodic disturbance current imaginary part $d\hat{I}_{Bn}$ to cancel a period disturbance current, by subtracting the command compensating currents $I_{An}^*$ and $I_{Bn}^*$ through the pulsation extracting filter $G_F$, respectively, from the estimated current real part $\hat{I}_{An}$ and the estimated current imaginary part $\hat{I}_{Bn}$ of the estimated current.

* * * * *